(12) United States Patent
Scopic et al.

(10) Patent No.: US 9,341,804 B2
(45) Date of Patent: May 17, 2016

(54) CABLE STRAIN RELIEF FOR CABLES, IN PARTICULAR FIBER OPTIC CABLES

(75) Inventors: Nesa Scopic, Herisau (CH); Daniel Greub, St. Gallen (CH); Patrick Zaina, Gossau (CH); Laif Gadmer, Uzwil (CH)

(73) Assignee: Huber+Suhner AG, Herisau (CH)

( * ) Notice: Subject to any disclaimer, the term of this patent is extended or adjusted under 35 U.S.C. 154(b) by 0 days.

(21) Appl. No.: 14/347,955

(22) PCT Filed: Aug. 28, 2012

(86) PCT No.: PCT/EP2012/066645
§ 371 (c)(1),
(2), (4) Date: Jul. 3, 2014

(87) PCT Pub. No.: WO2013/050202
PCT Pub. Date: Apr. 11, 2013

(65) Prior Publication Data
US 2015/0131945 A1    May 14, 2015

(30) Foreign Application Priority Data

Oct. 6, 2011    (CH) ..................................... 1638/11

(51) Int. Cl.
| | |
|---|---|
| *G02B 6/36* | (2006.01) |
| *G02B 6/44* | (2006.01) |
| *G02B 6/38* | (2006.01) |
| *B23P 11/00* | (2006.01) |
| *H02G 15/007* | (2006.01) |

(52) U.S. Cl.
CPC ............. *G02B 6/4471* (2013.01); *B23P 11/005* (2013.01); *G02B 6/3887* (2013.01); *H02G 15/007* (2013.01); *Y10T 29/49908* (2015.01)

(58) Field of Classification Search
CPC .. G02B 6/3887; G02B 6/4401; G02B 6/4405; G02B 6/3869; B23P 11/005; H02G 15/007; Y10T 29/49908
USPC ....................................................... 385/53–94
See application file for complete search history.

(56) References Cited

U.S. PATENT DOCUMENTS

| | | | | |
|---|---|---|---|---|
| 4,298,241 A | * | 11/1981 | Bernstein ............... | H01R 13/68 439/620.08 |
| 4,492,816 A | * | 1/1985 | Morel ................... | H02G 15/113 174/77 R |
| 4,693,550 A | * | 9/1987 | Brown ................... | G02B 6/381 385/81 |
| 4,824,198 A | * | 4/1989 | Anderton ............. | G02B 6/2553 385/135 |
| 4,889,406 A | * | 12/1989 | Sezerman ........................ 385/35 |
| 5,080,460 A | * | 1/1992 | Erdman ............... | G02B 6/3887 385/81 |

(Continued)

FOREIGN PATENT DOCUMENTS

GB    2069170 A  *  2/1980    ............... G02B 5/14
WO    WO 2009/042066 A1    4/2009

*Primary Examiner* — Ryan Lepisto
*Assistant Examiner* — Guy Anderson
(74) *Attorney, Agent, or Firm* — Pauley Erickson & Kottis

(57) ABSTRACT

The invention relates to a means of cable strain relief (1) comprising a crimping sleeve (3) for the mechanical operative connection of a cable (5) to a crimping neck (2), wherein the crimping sleeve (3) is used in the crimped state for clamping a textile braid (7) of the cable (5) intended for stain relief between the crimping sleeve (3) and the crimping neck (2). At its cable-side end, the crimping sleeve (3) comprises a deformable plastic sleeve (4) that produces a mechanical operative connection in the crimped state between an exterior jacket (6) of the cable (5) and the crimping sleeve (3).

11 Claims, 1 Drawing Sheet

(56) References Cited

U.S. PATENT DOCUMENTS

| | | | | |
|---|---|---|---|---|
| 5,131,063 A * | 7/1992 | Monroe | ............... | G02B 6/3887 385/53 |
| 5,142,602 A * | 8/1992 | Cabato | ................ | G02B 6/32 385/81 |
| 5,455,880 A * | 10/1995 | Reid et al. | ..................... | 385/87 |
| 5,749,756 A * | 5/1998 | Vockroth | ............... | H01R 4/203 174/84 C |
| 6,152,609 A * | 11/2000 | Dzyck et al. | ..................... | 385/86 |
| 6,206,579 B1 * | 3/2001 | Selfridge | ............. | G02B 6/3869 385/53 |
| 6,238,104 B1 * | 5/2001 | Yamakawa | ........... | G02B 6/3869 385/81 |
| 6,382,844 B1 * | 5/2002 | Dubois et al. | ................... | 385/81 |
| 6,623,181 B1 * | 9/2003 | Daems | ................ | G02B 6/2558 385/99 |
| 6,726,373 B2 * | 4/2004 | Lutzen et al. | ................... | 385/87 |
| 7,942,587 B2 | 5/2011 | Barnes et al. | | |
| 2002/0045096 A1 * | 4/2002 | Sandberg | ................ | H01M 2/26 429/163 |
| 2002/0126967 A1 * | 9/2002 | Panak et al. | ..................... | 385/101 |
| 2002/0159711 A1 * | 10/2002 | Lutzen et al. | ................... | 385/62 |
| 2002/0164130 A1 * | 11/2002 | Elkins, II | ............. | G02B 6/3887 385/87 |
| 2007/0297744 A1 * | 12/2007 | Martin | ................ | G02B 6/2558 385/135 |
| 2009/0087147 A1 * | 4/2009 | Barnes | ................ | G02B 6/3887 385/72 |
| 2014/0119687 A1 * | 5/2014 | Hao | ....................... | G01L 1/246 385/12 |

* cited by examiner

CABLE STRAIN RELIEF FOR CABLES, IN PARTICULAR FIBER OPTIC CABLES

BACKGROUND OF THE INVENTION

1. Field of the Invention

The invention falls within the field of cable strain relief devices for cables, in particular fibre optic cables.

2. Discussion of Related Art

The prior art discloses crimped cable strain relief devices for optical connectors. These use crimp sleeves, which match the cable diameter. In order to mechanically connect a cable to a crimp neck, fibres arranged under the cable outer sheath are pressed against the connector-side crimp neck by means of a crimp sleeve which matches the cable outer diameter. The crimp sleeves are turned or deep-drawn parts. One disadvantage of the solutions known from the prior art is that matching crimp sleeves are required for each cable diameter. Another disadvantage is that the solutions known from the prior art require a separate anti-kink member.

WO2009/042066 (U.S. Pat. No. 7,942,587) from Corning Cable Systems LLC was published on 2 Apr. 2009 and describes a comparatively complex crimped cable strain relief device for joining a fibre optic cable to a connector. In contrast to the prior art, to improve strain relief, an intermediate sleeve provided with splines is clamped below the crimp sleeve, thereby improving clamping of the cable-side cord responsible for strain relief. One disadvantage is that the cable sheath is not secured, meaning that tensile forces then have to be absorbed solely by the cords. An additional anti-kink bush is mandatory.

The fabrication methods known from the prior art either are complex, and therefore costly, or do not sufficiently meet the desired quality standard in relation to strain relief. To produce a double strain relief device known from the prior art either a repeated crimping operation or a stepped special tool is required. In this case, too, each cable size requires a matching component and appropriate tools.

An object of the invention is to propose an improved crimp connection for cables, in particular optical cables, which is free from the disadvantages known from the prior art.

SUMMARY OF THE INVENTION

This object is achieved by the device defined in the claims and the associated method.

The known techniques in crimp engineering for fitting a plug-in connector to a glass fibre cable is generally very labour-intensive. To secure the cable against strain, a cable-side fibre braid is clamped by means of a crimp sleeve to a connector-side crimp neck. Depending on the cable type, the fibre braid is usually made up either of kevlar or aramid fibres, or of other conductive or non-conductive fibres, which are arranged under an outer cable sheath.

Often, in another work step the cable sheath is also pinched under one end of the crimp sleeve. An anti-kink bush that is slid, at the plug/cable junction, onto the crimp sleeve offers additional mechanical protection, and laterally supports the cable, behind the crimp sleeve, against unwanted bending. The crimp sleeve is generally produced as a rotary part and may have a shoulder for securing the cable sheath. Alternatively, crimp sleeves are produced as deep-drawn parts. They may have, for example, one or more inner grooves.

One embodiment of the invention uses a cylindrical crimp sleeve made of a ductile, deformable material, such as metal, together with a sleeve made of a more flexible material, such as plastic material. The fibre braid (e.g. aramide cords) responsible for strain relief is pinched on the crimp neck (plug body) under the metal sleeve. In the same crimping operation, the sleeve made of the more flexible material (plastic sleeve) is crimped onto the cable sheath. The plastic sleeve is pressed via the crimp sleeve onto the cable sheath and advantageously has inner webs or knobs which interlock with the cable sheath during this process. One end of the plastic sleeve may, for example, be slid or pressed into the metal sleeve. One option is for the plastic sleeve to be operatively connected to the crimp sleeve with injection moulding.

In the crimping operation, both strain relief by means of the fibre braid and strain relief by means of the cable sheath are produced, it being possible for the plastic sleeve to also act as an anti-kink member. One advantage is that the same crimping tool and the same crimp sleeve or the same crimp neck can be used for different cable diameters; only the comparatively cost-effective plastic sleeve need be substituted for different cable diameters. This has a positive effect on production costs.

A preferred embodiment of a cable strain relief device according to the invention comprises a crimp sleeve for mechanically operatively connecting a cable to a crimp neck, the crimp sleeve serving, in the crimped state, to pinch a fibre braid of the cable, which braid is provided for strain relief, between the crimp sleeve and the crimp neck. The fibre braid is normally located inside the cable sheath. Depending on the field of application, the fibre braid may be, for example, made up either of aramid or Kevlar fibres and/or of electrically conductive (metal) fibres which simultaneously act as outer conductors. At its cable-side end, the crimp sleeve has a deformable plastic sleeve which, in the crimped state, produces a mechanical operative connection between the outer sheath of the cable and the crimp sleeve. The diameter of the plastic sleeve matches the outer sheath of the cable. If required, the plastic sleeve may have a multiple-part design, in order, for example, to be adaptable to the cable diameter. The plastic sleeve can be designed so as to be substituted, meaning, for example, that either plastic sleeves of different inner diameters or operative connection means can be inserted into the crimp sleeve. If required, the plastic sleeve can also be rigidly operatively connected to the crimp sleeve.

The interior of the plastic sleeve may have operative connection means which, in the crimped state, enter into an operative connection with the cable outer sheath and are used to increase traction. The plastic sleeve is advantageously produced from a more flexible material than the crimp sleeve. In certain fields of application, the plastic sleeve may be designed with slots, so that it can, for example, be placed onto the cable or helically wound therearound from the side. The plastic sleeve may have an anti-kink bush at its rear end, which anti-kink bush is either integrally formed thereon or designed as a separate part, extends in the cable longitudinal direction and prevents any unwanted kinks from forming in the cable. The plastic sleeve is advantageously produced by injection moulding, and can be operatively connected to the crimp sleeve by injection moulding, for example in that the crimp sleeve is placed into the injection mould and then cast round. The plastic sleeve can be pressed or welded into the crimp sleeve or glued in place therein. If required, the plastic sleeve can have a seal, which, in the operatively connected state, cooperates in a sealing manner with the cable sheath, thereby preventing unwanted penetration of dirt or moisture into the connector. The plastic sleeve may have a multi-part construction; for example, the plastic sleeve may consist of a more rigid material component used to produce the mechanical operative connection, while one or more other, for example more flexible, material components can form an anti-kink bush and/or a seal with respect to the cable sheath.

A method for producing a cable strain relief device according to the invention generally has the following steps (if required, the order of certain steps can be changed):

a. a plastic sleeve is slid onto the cable sheath;
b. a crimp sleeve is slid onto the cable sheath;
c. the fibre braid is freed from the cable sheath over a defined length;
d. the fibre braid is distributed over the crimp neck;
e. the crimp sleeve and the plastic sleeve are arranged over the crimp neck and on the cable sheath, respectively, in an operatively interconnected manner.
f. the crimp sleeve is crimped onto the crimp neck; at the same time the plastic sleeve is operatively connected to the cable sheath.

One aspect of the invention comprises a kit for producing a cable strain relief device according to the invention. This kit contains various plastic sleeves (for example, various inner diameters, various operative connection means, with or without an anti-kink member, various colours, various materials). Upon assembly, the plastic sleeves can be connected to the crimp sleeve. One advantage is that generally only crimp sleeves having one diameter are necessary to operatively connect cables of different diameters.

BRIEF DESCRIPTION OF THE DRAWINGS

The invention will be explained in more detail with reference to the embodiments shown in the following drawings and to the associated description, in which drawings.

DETAILED DESCRIPTION OF THE INVENTION

Figure 1:
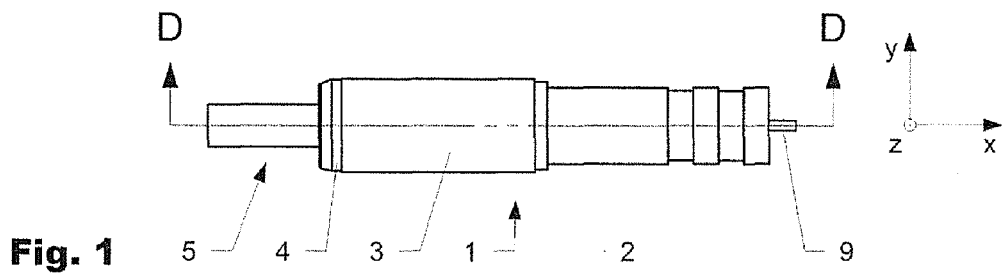
FIG. 1 is a plan view of a cable strain relief device according to the invention.
Figure 2:
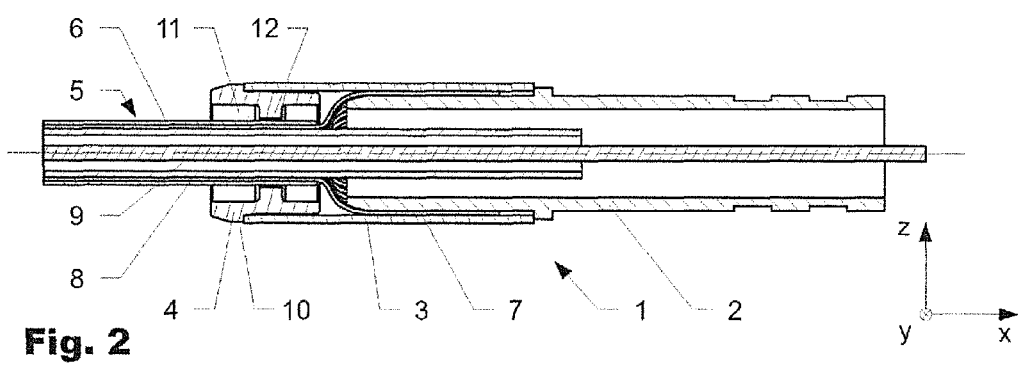
FIG. 2 is a sectional view, taken along the section line DD, of the cable strain relief device according to FIG. 1.
Figure 3:
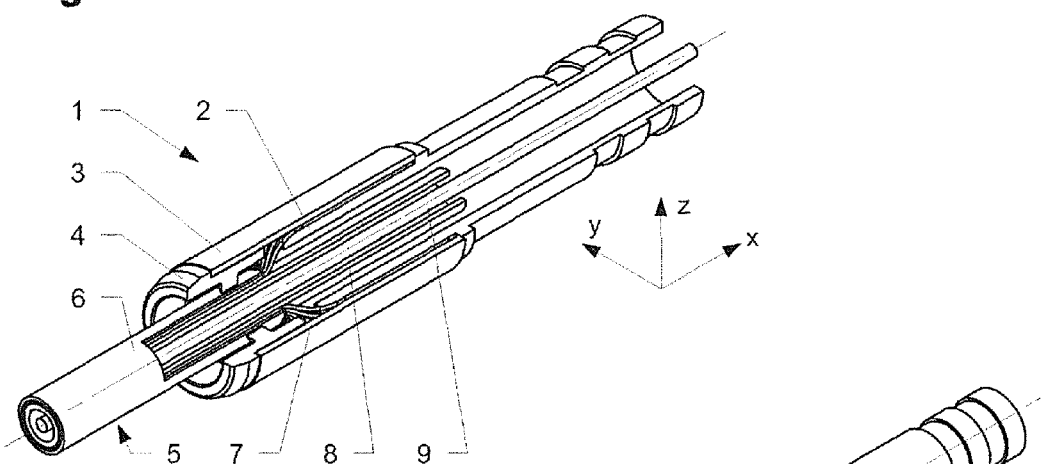
FIG. 3 is a perspective view, taken obliquely from above, of the cable strain relief device according to FIG. 1.
Figure 4:
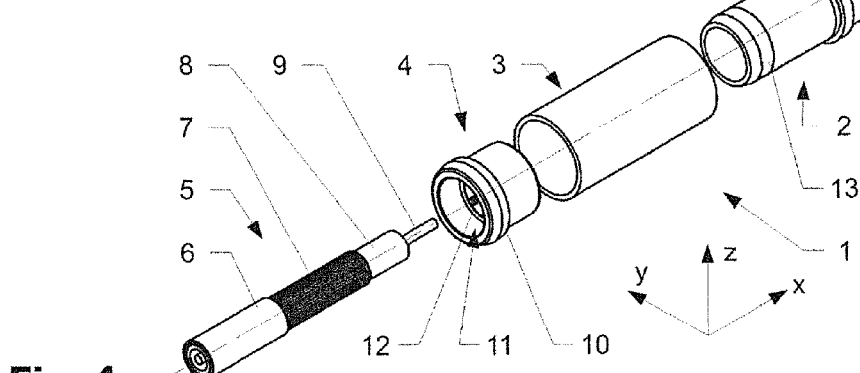
FIG. 4 is a perspective exploded view, taken obliquely from above, of the components of a cable strain relief device according to FIG. 1.

FIG. 1 is a schematic plan view of a cable strain relief device 1, according to the invention, in the assembled state. FIG. 2 is a sectional view, taken along the section line DD according to FIG. 1, of the crimp connection 1. FIG. 3 is a perspective view, taken obliquely from above, of the crimp connection 1. Part of the crimp connection is shown in section, so that the inner workings are visible. FIG. 4 is an exploded view of the crimp connection 1 according to the preceding drawings.

The cable strain relief device 1 is formed by a crimp neck 2 which, in the operatively connected state, cooperates with a crimp sleeve 3. The crimp neck 2 is typically a component of a connector or of another assembly, or is directly or indirectly operatively connected thereto. Inserted in the region of the rear, cable-side end of the crimp sleeve 3, there is a plastic sleeve 4, part of which projects into the crimp sleeve 3 in the embodiment shown. A cable 5 has a cable sheath 6 which surrounds a fibre braid 7. The fibre braid 7 is arranged on an inner tube 8. A light guide 9 extends inside the inner tube 8.

In the assembled state (according to FIG. 1 to 3), the fibre braid 7 is pinched between the crimp neck 2 and the crimp sleeve 3 pressed thereon, thereby producing a mechanical operative connection between the cable 5 and the crimp neck 2, which serves to relieve strain. At the same time, the plastic sleeve 4 is operatively connected to the cable sheath 6.

As can be seen in FIG. 2, the plastic sleeve 4 is slid into the crimp sleeve 3 as far as a mechanical stop (front edge) 10. The crimp sleeve 3 has a coaxially extending through-opening 11, the diameter of which matches the outer diameter of the cable 5. In the opening 11, an inwardly projecting toothing 12 can be seen, which, in the crimped state, meshes with the cable sheath 6 and relieves said sheath of a defined amount of strain.

The crimp sleeve 3 and the crimp neck 2 are suitable for joining various cable diameters. If required, a clamping face 13 of the crimp neck 2 can have traction-enhancing elements, taking the form of, for example, splines or other protruding elements.

As can be seen in the exploded view according to FIG. 4, during assembly, the plastic sleeve 4 is slid, together with the crimp sleeve 3, onto the cable 5. Prior or subsequently to this, a region of the fibre braid 7 is freed from the cable sheath 6. Then, the fibre braid 7 is arranged on the clamping face 13 of the crimp neck 2, and the crimp sleeve 3 is then slid, together with the plastic sleeve 4, over the fibre braid 7 and the crimp neck and pressed together therewith in one step. As a result of the crimp sleeve 3 being pressed, the plastic sleeve 4 is meshed with the cable sheath 6.

The invention claimed is:

1. A cable strain relief device (1) comprising:
   a crimp sleeve (3) for mechanically operatively connecting a cable (5) to a crimp neck (2), the crimp sleeve (3) being used, in a crimped state, to pinch a fibre braid (7) of the cable (5), which braid is provided for strain relief, between the crimp sleeve (3) and the crimp neck (2), wherein at a crimp neck-side end the crimp sleeve (3) is crimped to the crimp neck (2) and at a cable-side end the crimp sleeve (3) includes a deformable plastic sleeve (4) which is arranged in the crimp sleeve (3) and which, in the crimped state, is crimped between an outer sheath (6) of the cable (5) and the crimp sleeve (3) and produces a mechanical operative connection that connects an inner surface of the crimp sleeve (3) at the cable-side end to the outer sheath (6) of the cable (5).

2. The cable strain relief device (1) according to claim 1, wherein an inner diameter of the plastic sleeve (4) matches a diameter of the outer sheath (6) of the cable (5).

3. The cable strain relief device (1) according to claim 1, wherein the plastic sleeve (4) is formed so as to be substitutable during manufacture.

4. The cable strain relief device (1) according to claim 1, wherein an interior of the plastic sleeve (4) includes operative connection means (12) which, in the crimped state, enter into an operative connection with the cable outer sheath (6).

5. The cable strain relief device (1) according to claim 1, wherein the plastic sleeve (4) comprises a more flexible material, than the crimp sleeve (3).

6. The cable strain relief device (1) according to claim 1, wherein the plastic sleeve (4) includes two or more slots.

7. The cable strain relief device (l) according to claim 1 wherein the plastic sleeve (4) includes an anti-kink hush at a rear end.

8. The cable strain relief device (1) according to claim 1, wherein the plastic sleeve (4) is operatively connected to the crimp sleeve (3) by injection moulding.

9. The cable strain relief device (1) according to claim 1, wherein the plastic sleeve (4) is pressed or welded into the crimp sleeve (3) or glued in place therein.

10. A method for producing a cable strain relief device (1), wherein the method comprises the following steps:

a. sliding a plastic sleeve (4) onto a cable sheath (6);

b. sliding a crimp sleeve (3) onto the cable sheath (6) such that the plastic sleeve (4) is arranged in the crimp sleeve (3);
c. arranging a fibre braid (7) under the cable sheath (6) and freeing the fibre braid (7) from the cable sheath (6) over a defined length;
d. distributing the fibre braid over a clamping face (13) of a crimp neck (2);
e. arranging a first end of the crimp sleeve (3) over the crimp neck (2) and arranging the plastic sleeve (4) over the cable sheath (6) and between a second end of the crimp sleeve (3) and the cable sheath (6) in an operatively interconnected manner;
f. crimping the crimp sleeve (3) onto the crimp neck (2), wherein the plastic sleeve (4) is operatively connected to the cable sheath (6).

11. The cable strain relief device (1) according to claim 1, wherein the fibre braid is pinched between a clamping face (13) of the crimp neck (2) and the inner surface at the crimp neck-side end of the plastic sleeve (4).

\* \* \* \* \*